(12) United States Patent
Frost et al.

(10) Patent No.: US 8,657,100 B2
(45) Date of Patent: Feb. 25, 2014

(54) CONVEYOR SLIDE PLATE WITH RESERVOIR

(75) Inventors: Charles C. Frost, Ada, MI (US); Jonathan M. Rathbun, Belmont, MI (US); David R. Moore, Belleville, MI (US)

(73) Assignee: Frost Links, Inc., Grand Rapids, MI (US)

( * ) Notice: Subject to any disclaimer, the term of this patent is extended or adjusted under 35 U.S.C. 154(b) by 887 days.

(21) Appl. No.: 12/426,641

(22) Filed: Apr. 20, 2009

(65) Prior Publication Data
US 2009/0260953 A1 Oct. 22, 2009

Related U.S. Application Data

(63) Continuation-in-part of application No. 11/707,603, filed on Feb. 16, 2007, now Pat. No. 7,520,379.

(60) Provisional application No. 60/774,149, filed on Feb. 16, 2006.

(51) Int. Cl.
*B65G 45/02* (2006.01)
*B65G 45/08* (2006.01)

(52) U.S. Cl.
CPC .................................. *B65G 45/08* (2013.01)
USPC ................... 198/500; 184/15.1; 104/172.4

(58) Field of Classification Search
USPC .......... 198/493, 500, 837, 841; 184/5, 12, 3.2, 184/15.1, 15.3, 65, 87, 81
See application file for complete search history.

(56) References Cited

U.S. PATENT DOCUMENTS

| | | | | |
|---|---|---|---|---|
| 706,963 | A | * | 8/1902 | Laban .............................. 184/5 |
| 2,059,063 | A | | 10/1936 | Tourville |
| 2,285,145 | A | * | 6/1942 | Burt .............................. 198/500 |
| 2,293,029 | A | | 8/1942 | Focke |
| 2,625,830 | A | | 1/1953 | Transeau |
| 2,660,898 | A | | 12/1953 | Kew |
| 3,742,863 | A | | 7/1973 | Rosenberger |
| 3,744,618 | A | * | 7/1973 | Monne et al. ................. 198/500 |
| 3,748,674 | A | | 7/1973 | Powell et al. |
| 3,929,078 | A | * | 12/1975 | Sears ............................ 104/111 |

(Continued)

FOREIGN PATENT DOCUMENTS

JP 10-045227 2/1998

OTHER PUBLICATIONS

International Search Report and Written Opinion for PCT/ Application No. PCT/US07/04028, filed on Feb. 16, 2007, which corresponds to the parent U.S. Appl. No. 11/707,603.

*Primary Examiner* — William R Harp
(74) *Attorney, Agent, or Firm* — Mitchell Intellectual Property Law, PLLC

(57) ABSTRACT

A conveyor slide plate for movably supporting a support element along a track or rail of a material handling system includes a body portion configured to be received at the track or rail and to move along the track or rail when driven by a chain of the material handling system. The body portion of the slide plate includes at least one reservoir formed in an upper surface of the body portion. The reservoir is configured to receive lubricating fluid therein, and is configured to direct the flow of the lubricating fluid toward a sliding interface between the body portion of the slide plate and the track or rail, such as to at least one perimeter region of the body portion of the slide plate.

25 Claims, 4 Drawing Sheets

(56) References Cited

U.S. PATENT DOCUMENTS

| | | | | |
|---|---|---|---|---|
| 4,062,414 A | * | 12/1977 | Cook | 177/145 |
| 4,088,079 A | * | 5/1978 | Herzog | 104/111 |
| 4,114,467 A | | 9/1978 | Petershack | |
| 4,140,025 A | | 2/1979 | Lapeyre | |
| 4,151,652 A | | 5/1979 | Palma | |
| 4,195,887 A | | 4/1980 | Ruddell | |
| 4,413,513 A | | 11/1983 | Ross et al. | |
| 4,493,680 A | | 1/1985 | Hoffmann | |
| 4,926,971 A | * | 5/1990 | Egger | 184/15.1 |
| 4,981,207 A | * | 1/1991 | Kuikka | 198/735.3 |
| 4,986,798 A | | 1/1991 | Van Rooij et al. | |
| 5,078,654 A | | 1/1992 | Naz | |
| 5,121,831 A | | 6/1992 | Fesker | |
| 5,186,280 A | | 2/1993 | Mattcheck | |
| 5,257,690 A | | 11/1993 | Dehne | |
| 5,305,872 A | | 4/1994 | Hutton | |
| 5,365,765 A | | 11/1994 | Gohl et al. | |
| 5,378,205 A | | 1/1995 | Gohl et al. | |
| 5,423,724 A | | 6/1995 | Cole et al. | |
| 5,461,852 A | | 10/1995 | Nagamatsu | |
| 5,482,154 A | | 1/1996 | Affeldt et al. | |
| 5,490,590 A | | 2/1996 | Courtney | |
| 5,492,215 A | | 2/1996 | Affeldt et al. | |
| 5,563,392 A | | 10/1996 | Brown et al. | |
| 5,593,003 A | * | 1/1997 | Abe et al. | 184/5.1 |
| 5,966,923 A | | 10/1999 | Nakamura | |
| 6,098,787 A | | 8/2000 | Murano | |
| 6,125,968 A | * | 10/2000 | Shirai | 184/5 |
| 6,138,820 A | | 10/2000 | Ewert | |
| 6,161,685 A | | 12/2000 | Stebnicki | |
| 6,241,080 B1 | | 6/2001 | Tuomikoski | |
| 6,244,426 B1 | | 6/2001 | Murano et al. | |
| 6,321,523 B1 | | 11/2001 | Christmas | |
| 6,364,094 B1 | | 4/2002 | Aistmar | |
| 6,419,078 B1 | * | 7/2002 | Leathers | 198/500 |
| 6,474,464 B1 | | 11/2002 | Horton et al. | |
| 6,478,115 B1 | | 11/2002 | Wech et al. | |
| 6,691,862 B1 | | 2/2004 | Mogens | |
| 6,746,353 B2 | | 6/2004 | Albertin et al. | |
| 6,755,295 B2 | * | 6/2004 | Weskamp et al. | 198/500 |
| 6,782,687 B1 | | 8/2004 | Mingers | |
| 6,862,939 B2 | | 3/2005 | Frost | |
| 6,938,732 B2 | | 9/2005 | Garbagnati | |
| 6,978,885 B1 | | 12/2005 | Schumacher | |
| 6,991,094 B2 | | 1/2006 | Frost | |
| 6,993,978 B2 | | 2/2006 | Frost | |
| 7,063,207 B2 | | 6/2006 | Sykora | |
| 7,246,699 B2 | | 7/2007 | Frost et al. | |
| 7,520,379 B2 | | 4/2009 | Frost et al. | |
| 2005/0217531 A1 | | 10/2005 | Waldmiller | |
| 2007/0184698 A1 | | 8/2007 | Rathbun et al. | |
| 2007/0193860 A1 | | 8/2007 | Frost et al. | |

* cited by examiner

CONVEYOR SLIDE PLATE WITH RESERVOIR

CROSS REFERENCE TO RELATED APPLICATIONS

The present application is a continuation-in-part of U.S. patent application Ser. No. 11/707,603, filed Feb. 16, 2007, now U.S. Pat. No. 7,520,379, which claims the benefit of U.S. provisional application Ser. No. 60/774,149, filed Feb. 16, 2006, which are hereby incorporated herein by reference in their entireties.

FIELD OF THE INVENTION

The present invention relates generally to material handling or conveying systems and, more particularly, to slide plates of such material handling or conveying systems.

BACKGROUND OF THE INVENTION

A material handling system may consist of a track along which a plurality of trolleys or slide plate assemblies the like are guided and supported. The slide plate may slide along a track or rail and a pusher dog or support structure (such as for supporting an article or item to be conveyed along the conveying path) may be supported from the slide plate or slide plate assembly. The slide plate may engage or attach to a chain (such as one or more side or center links of a chain) that is driven to move the trolley and slide plate along the track or rail and the conveying path. As the slide plate moves along the track, the slide plate may encounter resistance or the slide plate or track may wear if the sliding interface of the slide plate and the track is not properly or sufficiently lubricated.

SUMMARY OF THE INVENTION

The present invention provides a slide plate or slide element for a material handling system that slides along a track or rail of the system and includes a reservoir formed at an upper surface or portion of the slide plate. The reservoir receives lubricant at the upper portion of the slide plate and the reservoir and/or a channel at the reservoir distributes the lubricant to the sliding interface between the slide plate and the track or rail to ease sliding movement of the slide plate along the track or rail.

According to an aspect of the present invention, a conveyor slide plate for movably supporting a support element along a track or rail of a material handling system includes a body portion configured to be received at the track and to move along the track when driven along the track, such as by a chain of the material handling system. The body portion includes at least one reservoir formed in an upper surface of the body portion. The reservoir is configured to receive lubricating fluid therein, and is configured to direct the flow of the lubricating fluid toward a lower surface of the slide plate that comprises a sliding interface between the body portion of the slide plate and the track when the slide plate is movably disposed at the track.

Optionally, at least one reservoir may be configured to direct the flow of the lubricating fluid to at least one perimeter region of the upper surface of the slide plate. Optionally, at least one channel may extend from a fluid receiving portion of at least one reservoir to at least one perimeter region of the upper surface to direct the flow of the lubricating fluid from the fluid receiving portion of the reservoir to at least one perimeter region and toward the sliding interface. Optionally, a pair of channels may be established at the upper surface of the slide plate, with each of the channels extending along the upper surface between the fluid receiving portion of the reservoir and a respective perimeter region of the upper surface of the slide plate.

According to another aspect of the present invention, a conveyor system for conveying product along a conveying path of a material handling system includes a track along the conveying path, a movable element and a lubricating device. The movable element is configured to move along the track. The movable element includes at least one reservoir formed in an upper surface thereof. The lubricating device is positioned along the conveying path and is operable to dispense lubricating fluid onto the movable element as the movable element moves along the track and along the conveying path. The reservoir is configured to receive lubricating fluid therein, and is configured to direct the flow of the lubricating fluid toward an interface between the movable element and another element or component of the conveyor system.

For example, the movable element may comprise a slide plate that slidably engages and moves along the track, whereby the reservoir is formed in an upper surface of the slide plate. The reservoir is configured to direct the flow of the lubricating fluid toward an interface between the slide plate and the track. Optionally, the movable element may comprise other conveyor components, such as a chain pin, where the reservoir is formed at an upper surface of a head portion of the chain pin and is configured to direct the flow of the lubricating fluid toward an interface between a shaft portion of the chain pin and one or more of the side and/or center links of the conveyor chain.

According to another aspect of the present invention, a method of lubricating a sliding interface of a slide plate of a material handling system includes providing a track and a plurality of slide plates. The slide plates comprise a body portion configured to be received at the track. The body portion includes a reservoir formed in an upper surface of the body portion. The slide plates are moved along the track to convey articles along the track. Lubricating fluid is delivered to the reservoir at the upper surface of at least some of the slide plates. The lubricating fluid is received in the reservoir of the body portion of the slide plate, and the lubricating fluid is directed from the reservoir of the slide plate to a sliding interface between the slide plate and the track.

Therefore, the present invention provides a slide plate or slide plate assembly for a conveyor system that receives lubricant or oil in a reservoir formed at an upper surface of the slide plate and distributes the lubricant or oil towards or to or onto the interface between the slide plate and the track along which the slide plate travels, such as via one or more channels formed at the upper surface and between the reservoir and a perimeter edge region of the upper surface and/or slide plate. The slide plate of the present invention thus facilitates lubrication of the sliding interface while the slide plate travels along the conveying path. The lubricating device of the material handling system may dispense lubricant or oil onto the upper surface of the slide plate, where the lubricant may then flow along the channel or channels and down onto the interface region of the track and/or slide plate to lubricate the interface between the slide plate and track. The present invention thus provides enhanced lubrication of the track and/or slide plate of the conveyor system.

These and other objects, advantages, purposes and features of the present invention will become apparent upon review of the following specification in conjunction with the drawings.

DESCRIPTION OF THE PREFERRED EMBODIMENTS

Figure 1:
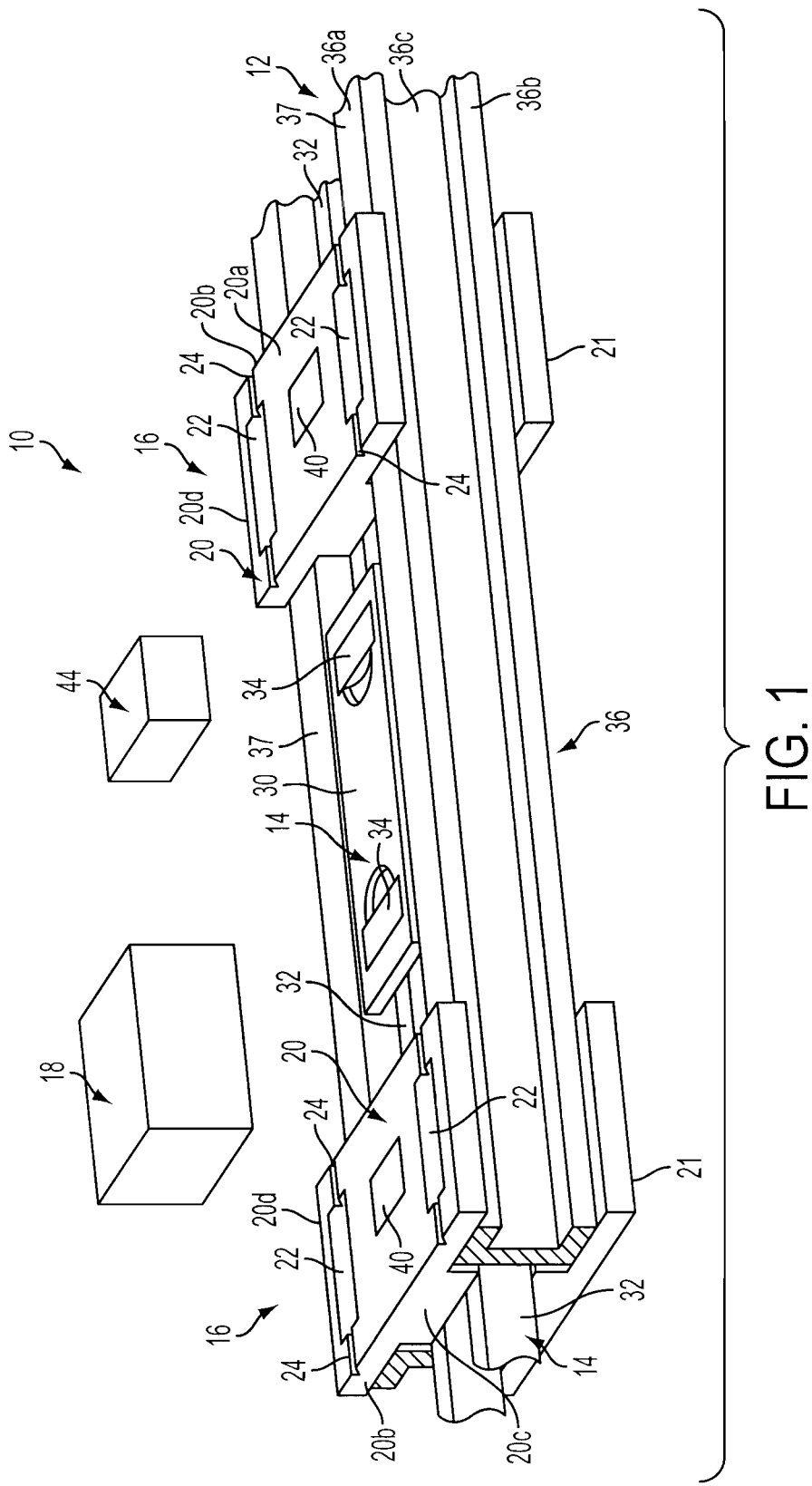
FIG. 1 is a perspective view of a conveyor system having a slide plate in accordance with the present invention.

Referring now to the drawings and the illustrative embodiments depicted therein, a material handling system or conveyor system 10 includes a track or rail 12, and a chain or section of chain 14 and a plurality of movable elements or slide plate assemblies 16 that slide or move along the track or rail 12 to convey products along the conveying system. Conveyor system 10 includes a lubricating device 18 for providing lubricant to the slide plate assemblies 16 as the slide plate assemblies travel along the track or rail 12. The slide plate assemblies 16 include an upper slide plate 20 that slides along an upper surface of the track or rail 12 as the chain 14 drives or moves the slide plate assemblies along the track or rail 12. The slide plate 20 includes at least one reservoir or recess 22 formed or established as a recess or depression or partial cavity at an upper surface 20a of the slide plate 20 and also includes at least one channel or trough 24 formed or established at or in the upper surface 20a and connecting or providing a channel or conduit between the fluid receiving or containing portion of the reservoir 22 and the outer perimeter edge or perimeter region 20b of the upper surface 20 of the slide plate 20. The reservoir 22 receives lubricant or oil or other suitable lubricating fluid from lubricating device 18, and the channel or channels 24 guide and distribute the lubricant to the interface between the slide plate 20 and the track or rail 12 to enhance slidable movement of the slide plate 20 along the track or rail 12, as discussed below.

Conveyor chain 14 includes a pair of side links 30 (only an upper side link is shown in FIG. 1) and a center link 32, which is connected or joined at respective side links 30 by a chain pin or pin element 34. Conveyor chain 14 and chain links 30, 32 and pin 34 may comprise any suitable conveyor chain and components, and may utilize aspects of the conveyor chains and components and systems described in U.S. Pat. Nos. 6,991,094; 6,862,939; 6,993,978; 7,246,699; 7,325,669; and/or 7,520,379, and/or U.S. patent application Ser. No. 11/840,818, filed Aug. 17, 2007, and/or U.S. patent application Ser. No. 11/602,792, filed Nov. 21, 2006, which are all hereby incorporated herein by reference in their entireties.

Conveyor chain 12 includes multiple linkages connected together in a continuous loop about a conveying system, as is known in the art. The chain links 30, 32 are joined together by pins or pin elements 34 to form a continuous conveyor chain that connects together a plurality of trolleys or the like for moving or driving the trolleys along the conveyor track or rail 12, such as in a known manner. The chain may be connected to slide plate assemblies 16 that are driven around the conveying track or rail via the chain and a driving device or motor or the like.

Figure 2:
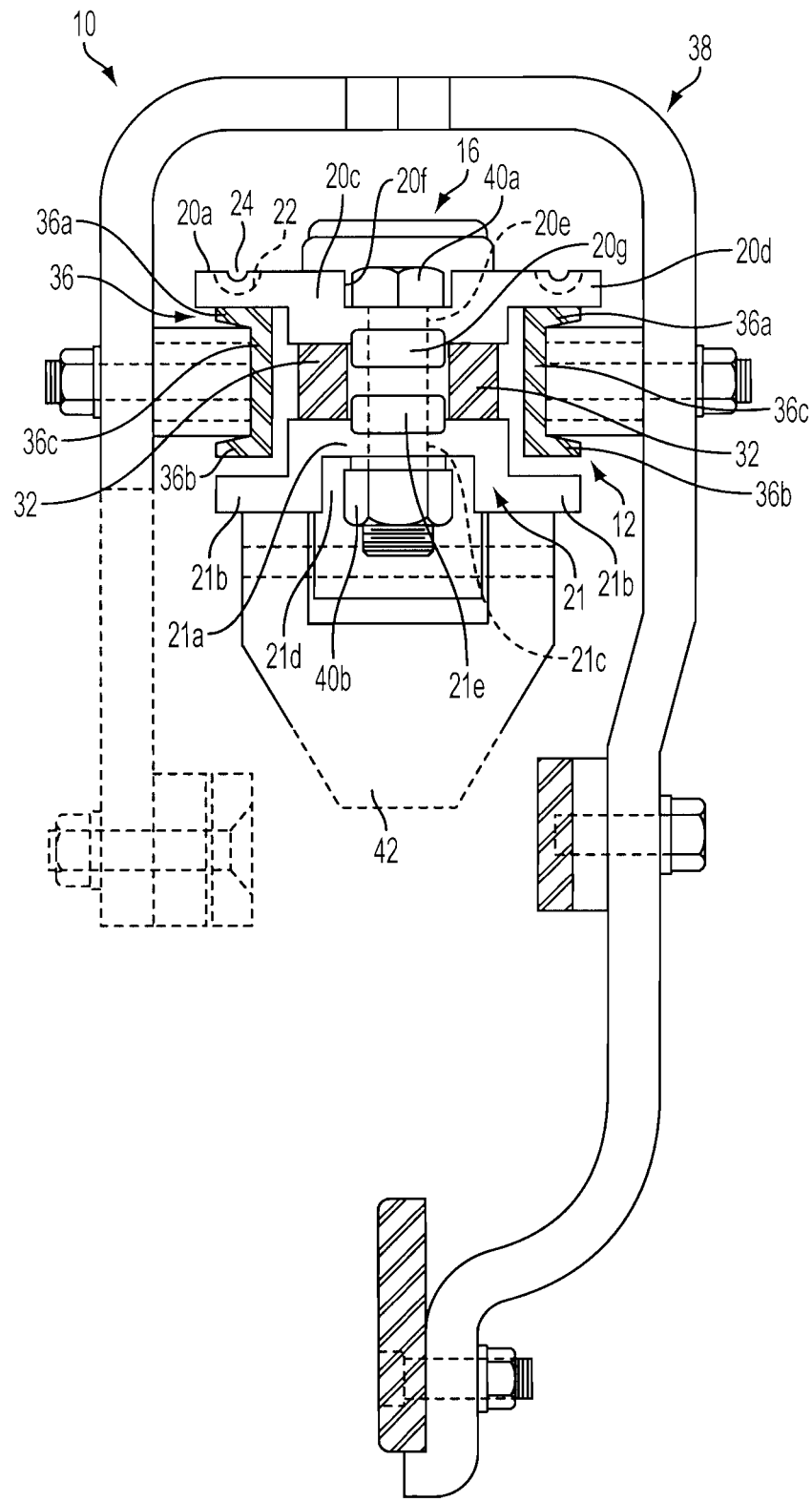
FIG. 2 is an end elevation and partial sectional view of the conveyor system of FIG. 1.
Figure 3:
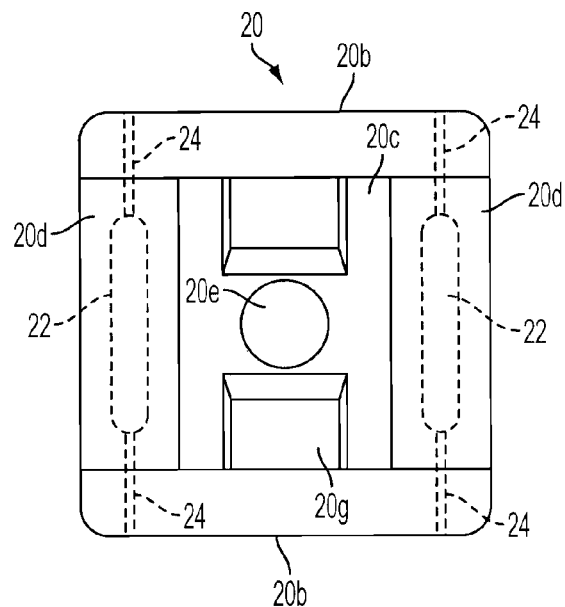
FIG. 3 is a lower plan view of a slide plate of the present invention.

As shown in FIG. 1, track or rail 12 comprises a pair of spaced apart C-shaped rails or rail members 36. The rail members 36 include an upper web or flange 36a (having an upper surface 37), a lower web or flange 36b and a central or connecting web 36c. The rail members 36 are spaced apart from one another with flanges 36a and 36b being generally horizontally oriented and the central webs 36c being generally vertically oriented when supported at the conveyor system facility (such as via a support structure 38 or the like, such as shown in FIG. 2). The central webs 36c are spaced apart to provide clearance or room for the chain 14 to be disposed between the rail members 36 to move the slide plate assemblies 16 along the track or rail 12 and along the conveyor path. Although shown and described as comprising a pair of spaced apart C-shaped rails or rail members, the track or rail may comprise any suitable track or rail configuration along which the slide plate assembly may be moved, such as via a drive conveyor chain or the like, while remaining within the spirit and scope of the present invention.

Slide plate assembly 16 includes upper slide plate 20 and a lower slide plate 21 that are connected together or joined via a connecting element 40, such as a fastener, such as a threaded bolt 40a and threaded nut 40b (such as shown in FIG. 2) or the like. Upper slide plate 20 comprises a central portion 20c and opposite side flanges or wings 20d extending laterally outward from the central portion 20c. The central portion 20c has an aperture or passageway 20e formed therethrough for receiving a shaft portion of the connecting element 40 therethrough (such as shown in FIG. 2). The central portion 20c may include a recess 20f formed at an upper end of passageway 20e and at upper surface 20a, such as for receiving a head portion of fastener 40a at least partially therein.

Figure 4:
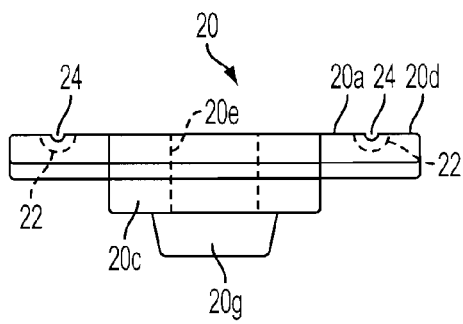
FIG. 4 is an end elevation of the slide plate of FIG. 3.
Figure 5:
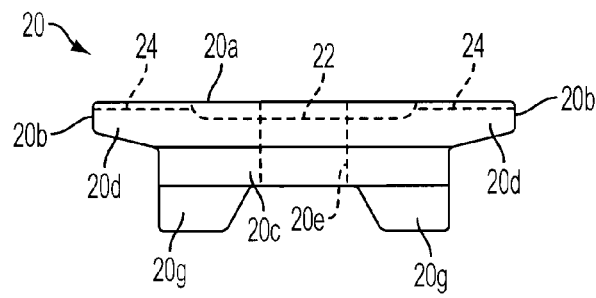
FIG. 5 is a side elevation of the slide plate of FIGS. 3 and 4.
Figure 6:
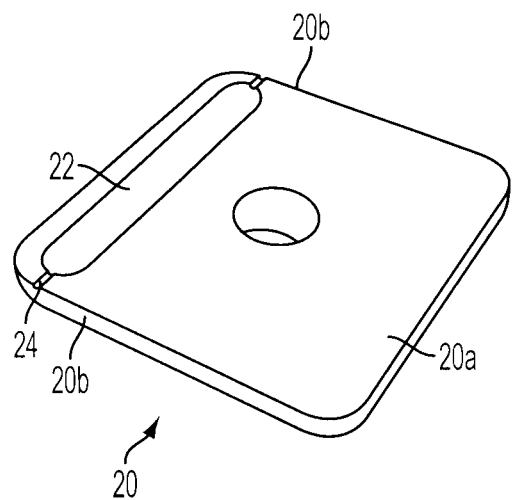
FIG. 6 is an upper perspective view of a slide plate of the present invention.
Figure 7:
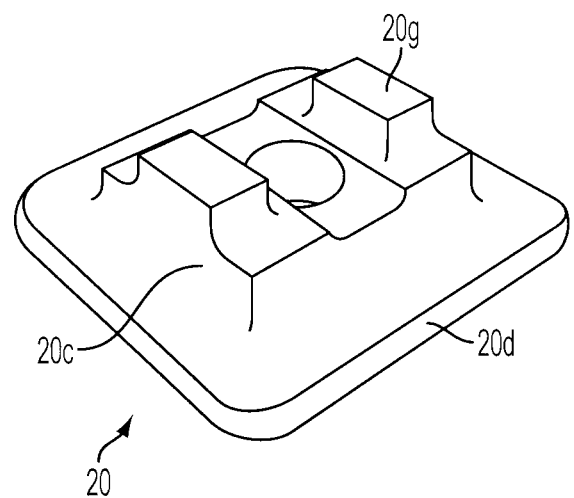
FIG. 7 is a lower perspective view of the slide plate of FIG. 6.

As shown in FIGS. 2 and 4, slide plate 20 may include one or more central spacing portions 20g at a lower region of central portion 20c. The central spacing portions 20g extend downward from upper slide plate body portion or central portion 20c and may be at least partially received in an aperture of a center link 32 of conveyor chain 14 when the slide plate assembly 16 is attached to or assembled at the conveyor chain, as discussed below.

In the illustrated embodiment, slide plate 20 includes a reservoir 22 formed at or near each side region of the slide plate, such as at an upper surface of the side flanges or wings 20d. The reservoir is configured to receive the lubricating fluid and to dispense the lubricating fluid at a forward or rearward end region of the slide plate so as to dispense the lubricating fluid onto the track members and/or at the sliding interface of the slide plate on the track members. In the illustrated embodiment, each reservoir 22 includes a channel 24 extending from each end thereof, whereby the channels 24 join or extend between the reservoir 22 and a respective forward or rearward perimeter region 20b of slide plate 20. The reservoirs 22 may receive lubricant or lubricating fluid from the lubricating device 18 and the channels 24 may dispense the lubricating fluid toward or onto the sliding interface between the slide plate 20 and the track or rail 12, as discussed below.

In the illustrated embodiment, reservoirs 22 are a generally elongated recesses or indentations formed or established in upper surface 20a of upper slide plate 20 for providing an area for collecting and receiving the lubricating fluid. Clearly, however, the reservoir may be any other shape without affecting the scope of the present invention. For example, a single reservoir may extend transversely or laterally across the upper surface of the slide plate, with a channel or reservoir dispensing portion extending from the reservoir to the front or forward (or the rear or rearward) perimeter region of each of the side wings or flanges of the slide plate. Such a configuration would dispense fluid to the sliding interface at each of the track or rail members via respective channels extending from and in fluid communication with the same reservoir.

The lower surface or bottom of reservoir 22 may be generally planar or flat, or the bottom of the reservoir may be angled downward from the center region of the head portion and toward the forward and/or rearward regions of the slide plate so as to encourage fluid flow outward to the channels 24 and along the channels 24 at the forward and rearward end regions of the slide plate 20. In the illustrated embodiment, the reservoir or recess or recessed portion 22 of the surface of the slide plate 20 has a circumferential wall defined by the slide plate that extends circumferentially around the recessed portion, with the channel or channels 24 extending through the circumferential wall to the perimeter region of the surface of the slide plate.

In the illustrated embodiment, channels 24 are provided on both sides of reservoir 22, such that the channels extend from the reservoir to the opposite perimeter edges 20b of slide plate 20 (such as to the forward and rearward end regions of the slide plate), so as to guide and direct the lubricating fluid onto the generally vertical front and rear perimeter edge regions of slide plate 20 and onto the track or rail 12. Optionally, channel or groove 24 may comprise a generally V-shaped channel or groove with a generally flat bottom surface. The sidewalls of channel 24 may be angled or sloped, such as at an angle of about 30 degrees or thereabouts, relative to a perpendicular line to the top of slide plate 20. The depth of the channel may be substantially the same depth as the recess or reservoir (or may optionally be a greater or lesser depth) so that the channel may substantially drain the lubricant from the reservoir. The reservoir and channel 24 shape and dimensions may vary and may be selected to suit the particular application of the slide plates, and to suit the lubricant used, the amount of lubricant dispensed on the track or rail and slide plate interface, and/or other specific requirements to the conveyor system environment.

Although shown as having channels extending forwardly and rearwardly from the respective reservoirs, clearly the slide plate may include only one channel extending from each reservoir (or may have no distinguishable channel, but rather the reservoir may be formed to have a dispensing portion at or near the forward and/or rearward regions of the slide plate), while remaining within the spirit and scope of the present invention. For example, a slide plate may include a channel extending from a respective reservoir toward a forward end or perimeter region of the slide plate, whereby fluid from the reservoir is dispensed (via the forward channel) onto the track or rail in front of the slide plate so as to provide lubrication to the sliding interface of that slide plate as the slide plate is moved along the track or rail.

Optionally, the lower or interface surface of the slide plate (the surface that engages and slides along the track or rail) may include a channel or recess or mouth at its forward end region to receive the dispensed fluid therein to enhance or induce the entry or flow of the lubricating fluid under the slide plate and between the slide plate and the track or rail and to the interface between the slide plate and track or rail (and to reduce or limit the slide plate from pushing the lubricant along the track or rail) as the slide plate moves along the track or rail. Optionally, it is envisioned that the slide plate may include one or more passageways formed through the side flanges between the reservoirs or channels and the lower surface of the side flanges (such as one or more vertically oriented holes or passageways formed from a lower surface or bottom region of the reservoir and the lower surface of the respective side flange), whereby the lubricating fluid may be dispensed from the reservoir and through the side flanges to the sliding interface between the upper surface of the track members and the lower surface of the side flanges of the slide plate. In such an embodiment, the holes or passageways provide the channel to channel or direct the fluid from the reservoir to or toward the sliding interface without first directing the fluid to the perimeter edge regions of the slide plates.

As shown in FIGS. 1 and 2, lower slide plate 21 of slide plate assembly 16 is similarly formed as upper slide plate 20 (and optionally may comprise a common slide plate that is flipped upside down when at the lower side of the slide plate assembly). In the illustrated embodiment, lower slide plate 21 includes a central portion 21a and opposite side flanges or wings 21b extending laterally outward from the central portion 21a. The central portion 21a has an aperture or passageway 21c formed therethrough for receiving a shaft portion of the connecting element 40 therethrough (such as shown in FIG. 2). The central portion 21a may include a recess 21d formed at an upper end of passageway 21c and at a lower surface or region of central portion 21a, such as for receiving fastener element or nut 40b at least partially therein. Slide plate 21 may also include one or more central spacing portions 21e at an upper region of central portion 21a. The central spacing portions 21e extend upward from lower slide plate body portion or central portion 21a and may be at least partially received in an aperture of a center link 32 of conveyor chain 14 when the slide plate assembly 16 is attached to or assembled at the conveyor chain, as discussed below.

Optionally, the slide plate assembly 16 may include or support a conveyor element, such as a support structure for supporting and movably supporting an object or item at and along the conveying path, or a pusher dog or engaging type element for engaging a trolley or other movable device or assembly or object or structure to move the movable object along the conveying path in response to the chain driving the slide plate assembly along the track or rail. In the illustrated embodiment, and with reference to FIG. 2, slide plate assembly may include a pusher dog element 42 that is attached to (such as welded to or fastened to or otherwise connected or joined to) the lower slide plate 21. Pusher dog element 42 extends downward from slide plate assembly 16 and track or rail 12 to engage an object or device that is to be moved along the conveying path.

Thus, when the slide plate assembly is assembled at the track or rail 12, the upper slide plate 20 engages the upper surface of the track or rail. In the illustrated embodiment, the lower surfaces of the side flanges or wings 20d engage and rest on the upper surfaces 37 of the upper flanges 36a of the track members 36. The spacing portions 20g and 21e of upper and lower slide plates 20 and 21, respectively, are at least partially received in the aperture of a respective center link 32 of conveyor chain 12, and the connecting element or fastener 40 may be sufficiently tightened to attach or secure or clamp the slide plate assembly at the center link 32. The side flanges or wings 21b of lower slide plate 21 are disposed below the lower flanges 36b of track members 36 and may function to limit or substantially preclude upward movement of the slide plate assembly relative to the track or rail as the slide plate assembly travels along the track or rail.

As the chain and slide plate assemblies are moved along the conveying path, there is relative sliding movement between the upper slide plate and the track or rail while the chain and slide plate assemblies travel along the conveying path. Thus, it is desirable to provide lubrication to the upper surface of the track or rail or to the lower surface of the upper slide plate assembly or to the interface between the lower surface of the upper slide plate assembly and the upper surface of the track or rail to reduce the friction and to reduce or limit wear on the slide plates and track or rail, and thus to enhance the performance of the system and to assist in keeping the slide plate assemblies and conveyor system operating smoothly. Lubricating device 18 thus may be provided along the conveying path to dispense lubricant or lubricating fluid to the chain at the appropriate time and location to lubricate the joints of the chain as the chain travels along the conveying path. Lubricating device 18 of conveyor system 10 may be attached or mounted at or near the track or beam 12, such as mounted directly to a portion of the track or may be mounted to a separate platform or the like, which is positionable generally along or adjacent to the track. An example of a suitable lubricating device is described in U.S. Pat. Nos. 6,419,078 and 7,520,379, which are hereby incorporated herein by reference in their entireties. However, other types of lubricating devices may be utilized along the conveying path, without affecting the scope of the present invention.

As can be seen in FIG. 1, when the slide plate assemblies are arranged and moved along the track or rail and conveying path, the reservoirs 22 of upper slide plates 20 extend generally longitudinally along the side regions of the slide plate, with the channels 24 directing fluid from the reservoirs 22 toward the front or rear perimeter end region of the slide plate and generally over the upper surface 37 of the track members 36 along which the slide plate is moving. Thus, when the reservoirs 22 of upper slide plate 20 are filled or at least partially filled with lubricant or lubricating fluid, the channels 24 function to dispense the lubricating fluid at the forward and/or rearward end of the side flanges 20*d* of slide plate 20 so as to dispense the fluid generally at and onto the upper surface 37 of upper web or flange 36*a* of track members 36 either in front of or behind the slide plate 20 as the slide plate assembly 16 travels along the track or rail 12.

The fluid is thus dispensed directly or substantially directly at the sliding interface between the upper slide plate 20 and the upper surface 37 of the track or rail 12. For example, if the fluid flows out of the channel at the forward end region of the slide plate, the fluid drips or flows onto the upper surface 37 of the track or rail 12 immediately in front of the slide plate 20 and thus lubricates the track or rail or interface of the slide plate and track or rail to provide enhanced sliding movement of the slide plate assembly along the track or rail. Likewise, for example, if fluid flows out of the channel at the rearward end region of the slide plate, the fluid drips or flows onto the upper surface 37 of the track or rail 12 behind or to the rear of the slide plate 20 and thus lubricates the track or rail or sliding interface of a subsequent slide plate and the track or rail to provide enhanced sliding movement of the subsequent slide plate assembly or assemblies that is or are moving along the track or rail.

Lubricating device 18 may function to directly apply lubricating fluid to the reservoirs 22 of the slide plates 20 as the slide plate assemblies 16 travel along the conveying path.

Optionally, a sensor or detection device or system 44 (shown as a separate detection device in FIG. 1, but could be part of the lubricating device or incorporated therein or located elsewhere along the conveying path while remaining within the spirit and scope of the present invention), such as a proximity sensor or the like (or a mechanical detector or any suitable detection device that is operable to detect a moving portion of the conveyor chain or slide plate assemblies or the like as the chain and slide plate assemblies are moved along the conveying path), may detect the presence of a portion of the conveyor (such as a portion of the chain pins or links or slide plates or the like) and may trigger the lubricating device 18 to dispense an appropriate amount of lubricating fluid at the appropriate time to provide lubricating fluid to the reservoir 22 of the appropriate slide plate 20 when it is located at or near the nozzles of the lubricating device 18.

Optionally, the detection device may detect one or more characteristics of the chain or pins or slide plates for measuring the chain pitch or determining or monitoring the wear in the chain or the like, such as by utilizing aspects of the conveyor systems described in U.S. Pat. Nos. 6,991,094; 6,862,939; 6,993,978; 7,246,699; 7,325,669; and/or 7,520,379, and/or U.S. patent application Ser. No. 11/840,818, filed Aug. 17, 2007, (and/or U.S. patent application Ser. No. 11/602,792, filed Nov. 21, 2006, which are all hereby incorporated herein by reference in their entireties. Optionally, the slide plate may include a surface characteristic or a projection or protrusion extending upward or outward therefrom and the sensor may function to detect the projection or surface characteristic and the lubricating device may be operable in response to such a detection, such as by utilizing aspects of the chain wear monitoring systems described in U.S. Pat. Nos. 6,862,939 and 6,993,978, and/or U.S. patent application Ser. No. 11/840,818, filed Aug. 17, 2007, which are all hereby incorporated herein by reference in their entireties.

Lubricating device 18 operates to dispense the lubricating fluid onto the slide plates 20 (and into the reservoirs 22 established at the upper surfaces thereof), but may also dispense lubricating fluid onto other parts of the chain and/or system as the chain and slide plate assemblies travel along the conveying path. Desirably, at least one lubricating nozzle is directed downward and toward the upper head surface of the slide plates, so that the lubricating fluid is dispensed onto the slide plate surface and received in the reservoir 22 formed in the upper slide plate 20. The reservoir 22 thus functions to receive and at least temporarily retain lubricating fluid at the upper surface of the slide plate. The channel or channels 24 substantially drain the lubricating fluid from the reservoir 22 and guide the lubricating fluid from the reservoir 22 to the outer perimeter edge of the slide plate, where the lubricating fluid may flow down along the forward and/or rearward edge regions of the slide plate and onto the track or rail 12 to substantially lubricate the sliding interface between the slide plates and the track or rail. Thus, during operation of conveyor system 10 and lubricating device 18, lubricating fluid is received by reservoirs 22 of slide plates 20 and temporarily received or stored in reservoir 22, and the lubricating fluid is channeled or guided along channel or channels 24 to distribute lubricating fluid onto the slide plate-track interface, either in front of the moving slide plate and/or behind the moving slide plate via the channel or channels 24, thereby resulting in enhanced lubrication and direct and controlled lubrication of the sliding interface of the conveyor system. Although shown and described as a slide plate with side wings that slide along an upper surface of a pair of spaced apart tracks or rails, it is envisioned that the slide plate may comprise any other type of sliding element (and may comprise any suitable material, such as, for example, steel or other suitable metallic material or a plastic or polymeric material or the like) that slidably engages and moves along one or more tracks or rails of a conveying or material handling system (such as by resting on and moving over an upper surface of a track member or such as by slidably engaging and moving along a side or lower surface of a track member), with a fluid reservoir established at the sliding element that is configured to receive lubricating fluid and to dispense the lubricating fluid toward or to a sliding interface between the sliding element and the track or rail, while remaining within the spirit and scope of the present invention.

Therefore, the present invention provides a movable element, such as a slide element or slide plate or slide plate assembly or such as a chain pin or other movable element that moves along a conveying path, for a conveyor of a material handling system that includes a reservoir for receiving and directing and distributing lubricating fluid to an interface between the movable element and another element or component of the conveyor system, such as to an interface between the slide plate and the track or rail, where it is most needed or desired. The present invention thus provides a lubrication system with enhanced distribution and direction of lubricating fluid to a sliding or rubbing or wearing interface of the movable element or slide plate during a lubricating process, which may result in enhanced operation and longer life cycles of the conveyor system and slide plates and track or rail or the like.

Changes and modifications to the specifically described embodiments may be carried out without departing from the principles of the present invention, which is intended to be limited only by the scope of the appended claims, as interpreted according to the principles of patent law.

The invention claimed is:

1. A conveyor slide plate for movably supporting a support element along a track or rail of a material handling system, said conveyor slide plate comprising:
    a body portion configured to be received at said track and to move along said track when driven along said track. said body portion comprising an upper surface:
    wherein said body portion includes at least one reservoir formed in said upper surface;
    a lower surface of said slide plate that comprises a sliding interface between said body portion of said slide plate and said track when said slide plate is movably disposed at said track; and
    wherein said reservoir is configured to receive lubricating fluid therein, said at least one reservoir being configured to direct the flow of the lubricating fluid toward said lower surface of said slide plate.

2. The conveyor slide plate of claim 1. wherein the upper surface comprises at least one perimeter region, and wherein said at least one reservoir is configured to direct the flow of the lubricating fluid to said at least one perimeter region of said upper surface.

3. The conveyor slide plate of claim 1, wherein the upper surface comprises at least one perimeter region, and wherein said at least one reservoir includes a fluid receiving portion and at least one channel extending from said fluid receiving portion of said at least one reservoir to said at least one perimeter region of said upper surface to direct the flow of the lubricating fluid from said fluid receiving portion of said at least one reservoir to said at least one perimeter region and toward said sliding interface.

4. The conveyor slide plate of claim 3. wherein said at least one channel comprises a pair of channels, each of said channels extending along said upper surface between said fluid receiving portion of said at least one reservoir and a respective perimeter region of said upper surface.

5. The conveyor slide plate of claim 3, wherein said fluid receiving portion of said at least one reservoir comprises a recessed portion at said upper surface of said body portion, said body portion defining a circumferential wall around said recessed portion, said at least one channel extending through said circumferential wall to said at least one perimeter region of said upper surface.

6. The conveyor slide plate of claim 1, wherein said body portion comprises a generally central portion that has an aperture therethrough, said aperture configured to receive an attachment element to attach a lower slide plate to said slide plate so as to assembly said slide plates together at said track.

7. The conveyor slide plate of claim 1, wherein said body portion comprises a generally central portion and opposite side portions that extend laterally from said generally central portion, and wherein said at least one reservoir is configured to direct the flow of the lubricating fluid to at least one of a forward end of said opposite side portions and a rearward end of said opposite side portions.

8. A conveyor system for conveying product along a conveying path of a material handling system, said conveyor system comprising:
    a track along said conveying path;
    a movable element that is movable along said conveying path, wherein said movable element includes an upper surface and at least one reservoir formed in said upper surface;
    a lubricating device positioned along said conveying path. said lubricating device being operable to dispense lubricating fluid onto said movable element as said movable element moves along said conveying path; and
    wherein said at least one reservoir is configured to receive lubricating fluid therein, said at least one reservoir configured to direct the flow of the lubricating fluid toward an interface between said movable element and said track.

9. The conveyor system of claim 8, wherein said movable element comprises a slide plate comprising a body portion configured to be received at said track and to move along said track, wherein said at least one reservoir is formed in an upper surface of said body portion.

10. The conveyor system of claim 9, wherein said upper surface comprises at least one perimeter region, said at least one reservoir is configured to direct the flow of the lubricating fluid to said at least one perimeter region.

11. The conveyor system of claim 10, wherein said at least one reservoir comprises at least one channel extending along said upper surface between a fluid receiving portion of said at least one reservoir and said at least one perimeter region of said upper surface, wherein said at least: one channel is configured to direct the flow of the lubricating fluid from said fluid receiving portion of said at least one reservoir to said at least one perimeter region and toward said interface between said body portion of said slide plate and said track.

12. The conveyor system of claim 11, wherein said at least one channel comprises a pair of channels, each of said channels extending along said upper surface between said fluid receiving portion of said at least one reservoir and a respective perimeter region of said upper surface.

13. The conveyor system of claim 11, wherein said fluid receiving portion of said at least one reservoir comprises a recessed portion at said upper surface of said slide plate, said slide plate defining a circumferential wall around said recessed portion, said at least one channel extending through said circumferential wall to said at least one perimeter region of said upper surface.

14. The conveyor system of claim 9, wherein said body portion comprises a generally central portion that has an aperture therethrough, said aperture configured to receive an attachment element to attach a lower slide plate to said slide plate so as to assembly said slide plates together at said track.

15. The conveyor system of claim 9, wherein said body portion comprises a generally central portion and opposite side portions that extend laterally from said generally central portion, and wherein said at least one reservoir is configured to direct the flow of the lubricating fluid to at least one a forward perimeter region of said opposite side portions and a rearward perimeter region of said opposite side portions.

16. The conveyor system of claim 15, wherein lower surfaces of said side portions of said body portion slide along upper surfaces of track members of said track, and wherein said at least one reservoir is configured to direct the flow of the lubricating fluid so that the lubricating fluid is received at a sliding interface and between said lower surfaces of said side portions and said upper surfaces of said track members.

17. The conveyor system of claim 9, further comprising a conveyor chain, wherein said slide plate is driven along said track by said conveyor chain.

18. The conveyor system of claim 17, wherein said conveyor chain comprises a plurality of chain links and a plurality of chain pin elements connecting respective sets of said chain links together, said conveyor chain being movable along a conveying path and functioning to move said slide plate along said track.

19. The conveyor system of claim 8 further comprising a detection device for detecting a movable portion of said system that moves along said track, and wherein said lubricating device is operable to dispense lubricating fluid into said at least one reservoir in response to said detection device.

20. A method of lubricating a sliding interface of a slide plate of a material handling system, said method comprising:
providing a track and a plurality of slide plates, said slide plates comprising a body portion configured to be received at said track, wherein said body portion includes at least one reservoir formed in an upper surface of said body portion;
moving said slide plate along said track to convey articles along said track;
delivering lubricating fluid to said reservoir at said upper surface of at least some of said slide plates;
receiving said lubricating fluid in said reservoir of said body portion of said slide plate; and
directing said lubricating fluid from said at least one reservoir of said slide plate to a sliding interface between said slide plate and said track.

21. The method of claim 20, wherein directing said lubricating fluid comprises directing said lubricating fluid from said at least one reservoir of said slide plate to at least one perimeter end region of said slide plate and toward said sliding interface via at least one channel formed in said upper surface of said body portion.

22. The method of claim 21, wherein said at least one channel comprises a pair of channels, and wherein directing said lubricating fluid comprises directing said lubricating fluid from said at least one reservoir to opposite perimeter end regions of said slide plate via said pair of channels.

23. The method of claim 20, wherein delivering lubricating fluid comprises delivering lubricating fluid in response to a detection of a movable portion of said conveyor system as it moves along said track.

24. The method of claim 20 further comprising detecting at least a portion of said slide plate as said slide plate moves along said track, and wherein delivering lubricating fluid comprises delivering lubricating fluid in response to a detection of at least a portion of said slide plate.

25. The method of claim 20, wherein moving said slide plate along said track comprises moving said slide plate along said track via a conveyor chain connected to said slide plate, and wherein said conveyor chain comprises a plurality of chain links and a plurality of chain pins connecting respective sets of said chain links together.

\* \* \* \* \*